(12) United States Patent
Aikawa et al.

(10) Patent No.: US 12,216,699 B2
(45) Date of Patent: Feb. 4, 2025

(54) INFORMATION PROCESSING DEVICE, AND GENERATION METHOD

(71) Applicant: Mitsubishi Electric Corporation, Tokyo (JP)

(72) Inventors: Takeyuki Aikawa, Tokyo (JP); Daishin Ito, Tokyo (JP); Hayato Uchide, Tokyo (JP); Yusuke Koji, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/234,551

(22) Filed: Aug. 16, 2023

(65) Prior Publication Data

US 2023/0394077 A1  Dec. 7, 2023

Related U.S. Application Data

(63) Continuation of application No. PCT/JP2021/015714, filed on Apr. 16, 2021.

(51) Int. Cl.
*G06F 16/38* (2019.01)
*G06F 16/383* (2019.01)
*G06F 40/279* (2020.01)

(52) U.S. Cl.
CPC .......... *G06F 16/383* (2019.01); *G06F 40/279* (2020.01)

(58) Field of Classification Search
CPC .............................. G06F 16/383; G06F 40/279
See application file for complete search history.

(56) References Cited

U.S. PATENT DOCUMENTS

| | | | |
|---|---|---|---|
| 2017/0262530 A1 | 9/2017 | Okura | |
| 2021/0035117 A1* | 2/2021 | O'Brien | H04L 67/10 |
| 2023/0251857 A1* | 8/2023 | Nasu | G06F 8/35 |
| | | | 717/102 |
| 2024/0004912 A1* | 1/2024 | Anand | G06F 18/2133 |

FOREIGN PATENT DOCUMENTS

| | | | |
|---|---|---|---|
| JP | 2018-136760 A | 8/2018 | |
| JP | 2019-159920 A | 9/2019 | |
| JP | 6638480 B2 | 1/2020 | |
| JP | 6773585 B2 | 10/2020 | |

OTHER PUBLICATIONS

International Search Report (PCT/ISA/210) issued in PCT/JP2021/015714, dated Jul. 6, 2021.
Written Opinion of the International Searching Authority (PCT/ISA/237) issued in PCT/JP2021/015714, dated Jul. 6, 2021.
Extended European Search Report for European Application No. 21936998.0, dated Mar. 6, 2024.

* cited by examiner

*Primary Examiner* — Loc Tran
(74) *Attorney, Agent, or Firm* — Birch, Stewart, Kolasch & Birch, LLP

(57) ABSTRACT

An information processing device includes an acquisition unit that acquires a plurality of documents and clue information including a plurality of words and a generation processing unit that generates inter-document relationship source information based on the plurality of documents and the clue information, generates high frequency appearance information based on the inter-document relationship source information, generates vicinity appearance information based on the high frequency appearance information, and generates an inter-document relationship table based on the vicinity appearance information.

9 Claims, 14 Drawing Sheets

FIG. 4

200 — INTER-DOCUMENT RELATIONSHIP SOURCE INFORMATION

| CLUE WORD | DOCUMENT ID | APPEARANCE LINE | APPEARANCE CHARACTER POSITION |
|---|---|---|---|
| WAREHOUSING | 1 | 2 | 1 |
| WAREHOUSING | 5 | 4 | 3 |
| WAREHOUSING | 10 | 2 | 1 |
| ... | ... | ... | ... |
| SHIPMENT | 3 | 10 | 2 |
| SHIPMENT | 7 | 11 | 5 |
| SHIPMENT | 11 | 12 | 10 |
| ... | ... | ... | ... |
| RECORD | 5 | 4 | 5 |
| RECORD | 7 | 11 | 1 |
| RECORD | 12 | 5 | 4 |
| ... | ... | ... | ... |

(Appearance Line and Appearance Character Position are grouped under APPEARANCE POSITION.)

FIG. 5

210 HIGH FREQUENCY APPEARANCE INFORMATION

APPEARANCE POSITION

| CLUE WORD | DOCUMENT ID | APPEARANCE LINE | APPEARANCE CHARACTER POSITION |
|---|---|---|---|
| WAREHOUSING | 1 | 2 | 1 |
| WAREHOUSING | 5 | 4 | 3 |
| WAREHOUSING | 10 | 2 | 1 |
| ... | ... | ... | ... |
| RECORD | 5 | 4 | 5 |
| RECORD | 7 | 11 | 1 |
| RECORD | 12 | 5 | 4 |
| ... | ... | ... | ... |

FIG. 7

230 — NEW INTER-DOCUMENT RELATIONSHIP SOURCE INFORMATION

| CLUE WORD COMBINATION | DOCUMENT ID | APPEARANCE LINE | APPEARANCE CHARACTER POSITION | APPEARANCE LINE | APPEARANCE CHARACTER POSITION |
|---|---|---|---|---|---|
| WAREHOUSING RECORD | 5 | 4 | 3 | 4 | 5 |
| WAREHOUSING RECORD | 15 | 1 | 10 | 2 | 1 |
| ... | ... | ... | ... | ... | ... |
| SHIPMENT | 3 | 10 | 2 | — | — |
| SHIPMENT | 7 | 11 | 5 | — | — |
| SHIPMENT | 11 | 12 | 10 | — | — |
| ... | ... | ... | ... | ... | ... |

FIG. 8

| INTER-DOCUMENT RELATIONSHIP TABLE | | | | 113 |
|---|---|---|---|---|
| CLUE WORD COMBINATION | DOCUMENT ID | DOCUMENT ID | INTER-DOCUMENT RELATIONSHIP SCORE | |
| WAREHOUSING RECORD | 5 | 15 | 3.5 | |
| WAREHOUSING RECORD | 15 | 25 | 2.0 | |
| WAREHOUSING RECORD | 5 | 25 | 3.2 | |
| ... | ... | ... | ... | |
| SHIPMENT | 3 | 7 | 1.5 | |
| SHIPMENT | 3 | 11 | 1.2 | |
| SHIPMENT | 7 | 11 | 1.3 | |
| ... | ... | ... | ... | |

| INTER-DOCUMENT RELATIONSHIP TABLE | | | |
|---|---|---|---|
| CLUE WORD COMBINATION | DOCUMENT ID | DOCUMENT ID | INTER-DOCUMENT RELATIONSHIP SCORE |
| WAREHOUSING RECORD | 5 | 15 | 3.5 |
| ... | ... | ... | ... |
| SHIPMENT | 3 | 7 | 1.5 |
| SHIPMENT | 5 | 15 | 2.0 |
| ... | ... | ... | ... |

| INTER-DOCUMENT RELATIONSHIP TABLE | | | |
|---|---|---|---|
| CLUE WORD COMBINATION | DOCUMENT ID | DOCUMENT ID | INTER-DOCUMENT RELATIONSHIP SCORE |
| "WAREHOUSING RECORD" SHIPMENT | 5 | 15 | 5.5 |
| ... | ... | ... | ... |
| SHIPMENT | 3 | 7 | 1.5 |
| ... | ... | ... | ... |

FIG. 12

200a INTER-DOCUMENT RELATIONSHIP SOURCE INFORMATION

| CLUE WORD | DOCUMENT ID | APPEARANCE POSITION | |
|---|---|---|---|
| | | APPEARANCE LINE | APPEARANCE CHARACTER POSITION |
| WAREHOUSING | 1 | 2 | 1 |
| WAREHOUSING | 5 | 4 | 3 |
| WAREHOUSING | 10 | 2 | 1 |
| ... | ... | ... | ... |
| APPARATUS-SPECIFIC/CONFIGURATION/ EXPANSION/DATA/OUTPUT | 1 | 10,11 | 10-2,10-5,... |
| APPARATUS-SPECIFIC/CONFIGURATION/ EXPANSION/DATA/OUTPUT | 10 | 12,13 | 12-5,12-10,... |
| APPARATUS-SPECIFIC/CONFIGURATION/ EXPANSION/DATA/OUTPUT | 20 | 5,6 | 5-10,5-13,... |
| ... | ... | ... | ... |
| RECORD | 5 | 4 | 5 |
| RECORD | 7 | 11 | 1 |
| RECORD | 12 | 5 | 4 |
| ... | ... | ... | ... |

| INTER-DOCUMENT RELATIONSHIP TABLE | | | 113a |
|---|---|---|---|
| CLUE WORD COMBINATION | DOCUMENT ID | DOCUMENT ID | INTER-DOCUMENT RELATIONSHIP SCORE |
| WAREHOUSING RECORD | 5 | 15 | 3.5 |
| WAREHOUSING RECORD | 15 | 25 | 2.0 |
| ... | ... | ... | ... |
| APPARATUS-SPECIFIC/CONFIGURATION/ EXPANSION/DATA/OUTPUT | 1 | 10 | 1.5 |
| APPARATUS-SPECIFIC/CONFIGURATION/ EXPANSION/DATA/OUTPUT | 10 | 31 | 1.2 |
| APPARATUS-SPECIFIC/CONFIGURATION/ EXPANSION/DATA/OUTPUT | 20 | 42 | 1.7 |
| ... | ... | ... | ... |

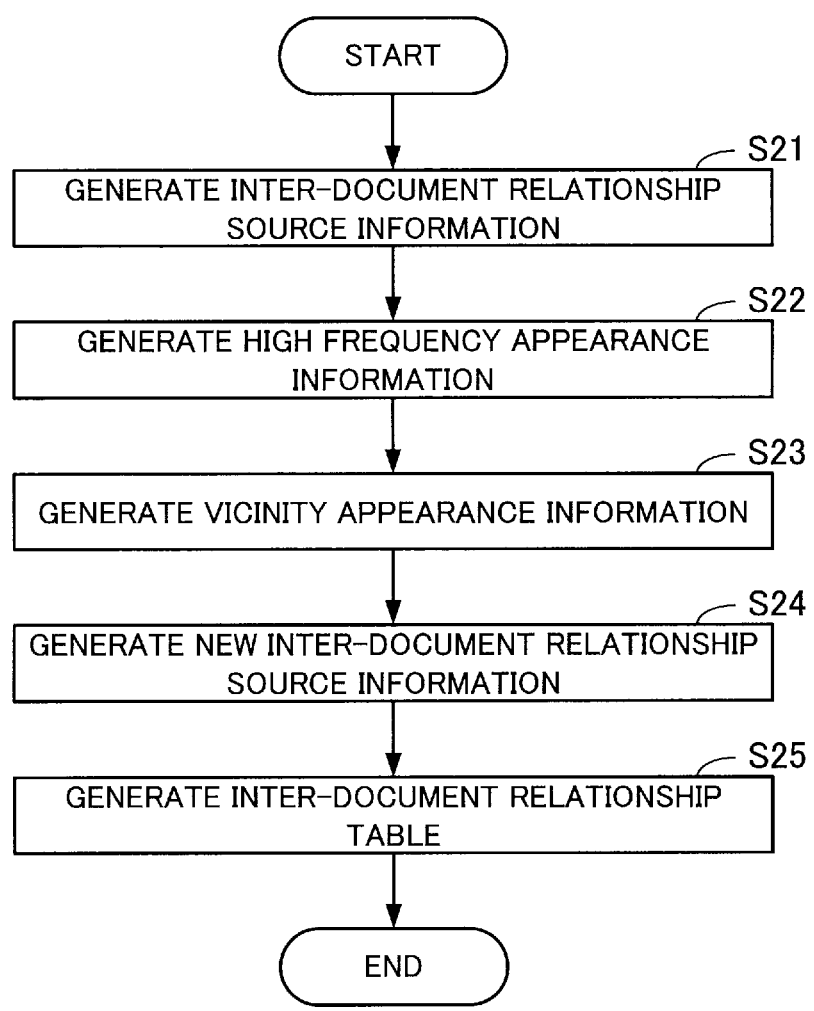

INFORMATION PROCESSING DEVICE, AND GENERATION METHOD

CROSS-REFERENCE TO RELATED APPLICATION

This application is a continuation application of International Application No. PCT/JP2021/015714 having an international filing date of Apr. 16, 2021.

BACKGROUND OF THE INVENTION

1. Field of the Invention

The present disclosure relates to an information processing device, and a generation method.

2. Description of the Related Art

There has been known a document search technology. For example, a document vector is used for the search. Here, a technology regarding the document vector has been proposed (see Patent Reference 1).

Patent Reference 1: Japanese Patent Application Publication No. 2018-136760

Incidentally, based on an inputted keyword, a device searches for a plurality of documents including the whole or part of the keyword. However, in the conventional search by using the document vector, a plurality of similar documents including the inputted keyword or a keyword similar to the inputted keyword are found by the search, whereas it is impossible to grasp relationship among these similar documents. Further, it is also impossible to search for documents having great relevance from a viewpoint different from the inputted keyword. For example, when searching for a design document of a certain system by using a keyword "warehousing record", documents relevant to "apparatus-specific configuration" as another viewpoint relevant to the keyword are not searched for. As above, in order to cause the device searching for a similar document to search for documents having great relevance to the similar document, it is necessary to previously associate the similar document and the relevant documents with each other. For example, it is possible to consider a method of associating the similar document with documents each having relationship with each of all the words included in the similar document. However, with this method, a document having a weak relationship may be associated with the similar document, such as a document whose only one word among a lot of words included in the document is associated with the similar document.

Further, since a lot of words are included in one document, a great amount of relevance is obtained by this method and there is a problem in that the user has no idea which relevant document to refer to.

SUMMARY OF THE INVENTION

An object of the present disclosure is to prevent the association with a document having weak relationship in the previous association like that described above.

An information processing device according to an aspect of the present disclosure is provided. The information processing device includes an acquisition unit that acquires a plurality of documents and clue information including a plurality of words and a generation processing unit that generates inter-document relationship source information indicating relationship between a plurality of documents including at least one of the plurality of words included in the clue information and an appearance position of each of the plurality of words included in the clue information in the document based on the plurality of documents and the clue information, judges based on the inter-document relationship source information whether or not a number of documents corresponding to each of the plurality of words included in the clue information is larger than or equal to a predetermined threshold value, generates high frequency appearance information indicating relationship between a plurality of documents including a plurality of words each corresponding to the number of documents larger than or equal to the threshold value and the appearance position of each of the plurality of words each corresponding to the number of documents larger than or equal to the threshold value in the document, generates vicinity appearance information indicating documents in which the plurality of words each corresponding to the number of documents larger than or equal to the threshold value appear in a predetermined range based on the high frequency appearance information, and generates inter-document relationship information indicating relationship between documents based on the vicinity appearance information.

According to the present disclosure, the association with a document having weak relationship can be prevented.

BRIEF DESCRIPTION OF THE DRAWINGS

The present disclosure will become more fully understood from the detailed description given hereinbelow and the accompanying drawings which are given by way of illustration only, and thus are not limitative of the present disclosure, and wherein:

FIG. 4 is a diagram showing an example of inter-document relationship source information in the first embodiment;

FIG. 5 is a diagram showing an example of high frequency appearance information in the first embodiment;

FIG. 7 is a diagram showing an example of new inter-document relationship source information in the first embodiment;

FIG. 8 is a diagram showing an example of an inter-document relationship table in the first embodiment;

FIG. 12 is a diagram showing an example of the inter-document relationship source information in the second embodiment;

FIG. 13 is a diagram showing an example of the inter-document relationship table in the second embodiment; and FIG. 14 is a flowchart showing an example of a process executed by an information processing device in the second embodiment.

DETAILED DESCRIPTION OF THE INVENTION

Embodiments will be described below with reference to the drawings. The following embodiments are just examples and a variety of modifications are possible within the scope of the present disclosure.

First Embodiment

Figure 1:
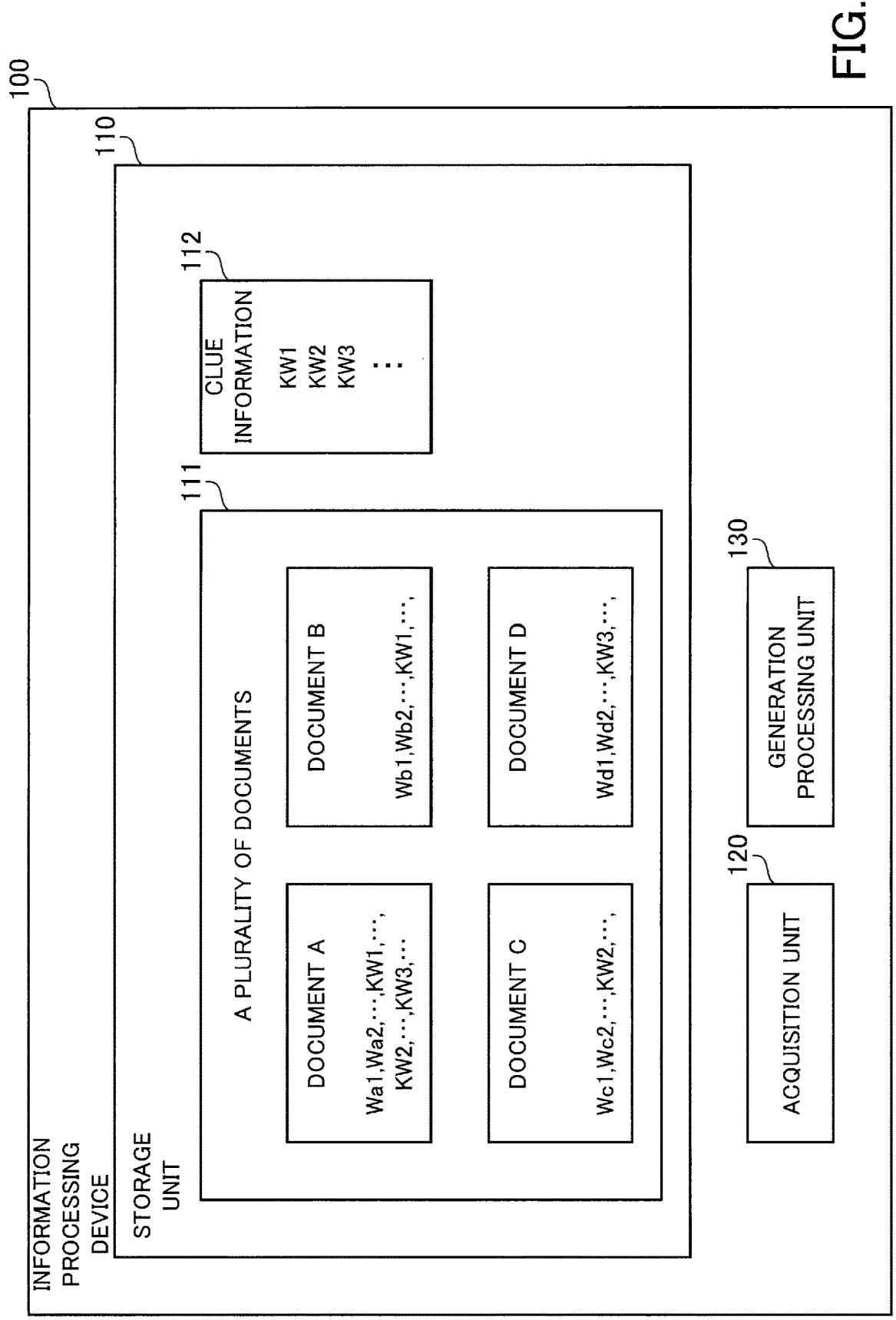
FIG. 1 is a block diagram showing functions of an information processing device in a first embodiment.

FIG. 1 is a block diagram showing functions of an information processing device in a first embodiment. The information processing device 100 is a device that executes a generation method. The information processing device 100 includes a storage unit 110, an acquisition unit 120 and a generation processing unit 130.

Here, hardware included in the information processing device 100 will be described below.

Figure 2:
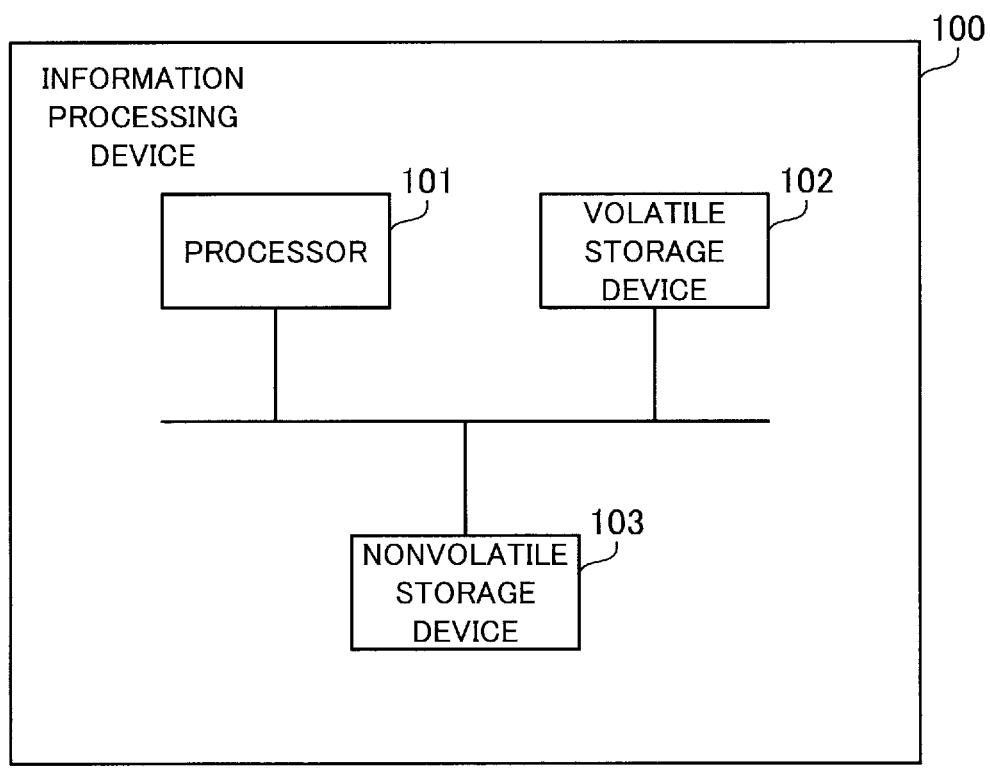
FIG. 2 is a diagram showing hardware included in the information processing device in the first embodiment.

FIG. 2 is a diagram showing the hardware included in the information processing device in the first embodiment. The information processing device 100 includes a processor 101, a volatile storage device 102 and a nonvolatile storage device 103.

The processor 101 controls the whole of the information processing device 100. The processor 101 is a Central Processing Unit (CPU), a Field Programmable Gate Array (FPGA) or the like, for example. The processor 101 can also be a multiprocessor. Further, the information processing device 100 may include a processing circuitry. The processing circuitry may be either a single circuit or a combined circuit.

The volatile storage device 102 is main storage of the information processing device 100. The volatile storage device 102 is a Random Access Memory (RAM), for example. The nonvolatile storage device 103 is auxiliary storage of the information processing device 100. The nonvolatile storage device 103 is a Hard Disk Drive (HDD) or a Solid State Drive (SSD), for example.

Returning to FIG. 1, the functions included in the information processing device 100 will be described below.

The storage unit 110 may be implemented as a storage area reserved in the volatile storage device 102 or the nonvolatile storage device 103.

Part or all of the acquisition unit 120 and the generation processing unit 130 may be implemented by a processing circuitry. Further, part or all of the acquisition unit 120 and the generation processing unit 130 may be implemented as modules of a program executed by the processor 101. For example, the program executed by the processor 101 is referred to also as a generation program. The generation program has been recorded in a record medium, for example.

The storage unit 110 may store a plurality of documents 111 and clue information 112. FIG. 1 shows that a document A, a document B, a document C and a document D are included in the plurality of documents 111. The character strings "Wan", "Wbn", "Wcn" and "Wdn" shown in the documents in FIG. 1 represent words. Incidentally, "n" is a positive integer. For example, "Wa1" and "Wa2" shown in the document A in FIG. 1 represent words.

The clue information 112 may be referred to also as a clue dictionary. The clue information 112 is information indicating a clue to inter-document relationship. Each character string "KWn" (n: positive integer) shown in the clue information 112 in FIG. 1 represents a word. For example, "KW1", "KW2" and "KW3" shown in the clue information 112 represent words. As above, the clue information 112 includes a plurality of words. Incidentally, the clue information 112 may be generated by a user by operating the information processing device 100, for example.

The acquisition unit 120 acquires a plurality of documents 111. For example, the acquisition unit 120 acquires the plurality of documents 111 from the storage unit 110. Here, the plurality of documents 111 may be stored in an external device (e.g., cloud server). When the plurality of documents 111 have been stored in the external device, the acquisition unit 120 acquires the plurality of documents 111 from the external device.

The acquisition unit 120 acquires the clue information 112. For example, the acquisition unit 120 acquires the clue information 112 from the storage unit 110. Here, the clue information 112 may be stored in an external device. When the clue information 112 has been stored in the external device, the acquisition unit 120 acquires the clue information 112 from the external device.

The generation processing unit 130 generates inter-document relationship source information based on the plurality of documents 111 and the clue information 112. The inter-document relationship source information indicates relationship between a plurality of documents including at least one of the plurality of words included in the clue information 112 and an appearance position of each of the plurality of words included in the clue information 112 in the document. An inter-document relationship source information generation process will be described below by using a concrete example.

Figure 3:
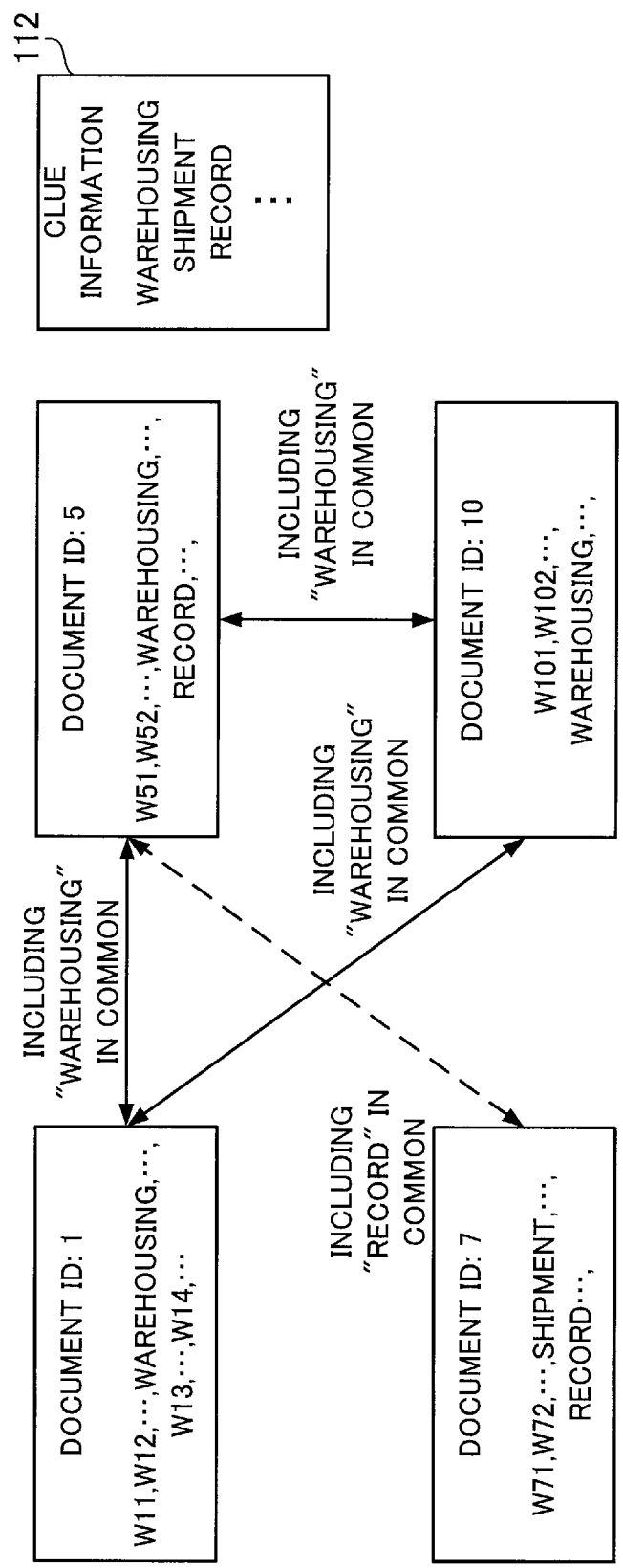
FIG. 3 is a diagram showing an example of an inter-document relationship source information generation process in the first embodiment.

FIG. 3 is a diagram showing an example of the inter-document relationship source information generation process in the first embodiment. FIG. 3 indicates that "warehousing", "shipment" and "record" are included in the clue information 112. Further, FIG. 3 shows document IDs (identifiers) "1", "5", "7" and "10". Incidentally, each "Wn" (n: positive integer) shown in the documents represents a word. For example, "W11" represents a word.

The generation processing unit 130 searches for documents including "warehousing" based on the plurality of documents 111 and the clue information 112. By this search, documents with the document IDs "1", "5" and "10" are found. Similarly, the generation processing unit 130 searches for documents including "shipment" based on the plurality of documents 111 and the clue information 112. By this search, a document with the document ID "7" is found. The generation processing unit 130 searches for documents including "record" based on the plurality of documents 111 and the clue information 112. By this search, documents with the document IDs "5" and "7" are found.

As above, the generation processing unit 130 searches for and finds the documents with the document IDs "1", "5", "7" and "10" including at least one of "warehousing", "shipment" and "record" included in the clue information 112, for example.

The generation processing unit 130 detects the appearance position of each of the plurality of words included in the clue information 112 in the document. For example, the generation processing unit 130 detects the appearance position of "warehousing" in the document with the document ID "1".

The generation processing unit 130 generates the inter-document relationship source information indicating the relationship between the document found by the search and the appearance position. An example of the inter-document relationship source information will be shown below.

FIG. 4 is a diagram showing an example of the inter-document relationship source information in the first embodiment. The inter-document relationship source information 200 includes items of clue word, document ID, appearance line and appearance character position. Incidentally, the items of appearance line and appearance character position may be regarded as an item of appearance position.

For example, the inter-document relationship source information 200 indicates that "warehousing" is included in the document with the document ID "1". Further, the inter-document relationship source information 200 indicates that "warehousing" appears at the "1"st character in the "2"nd line of the document with the document ID "1".

The generation processing unit 130 generates the inter-document relationship source information 200 as above.

Based on the inter-document relationship source information 200, the generation processing unit 130 judges whether or not the number of documents corresponding to each of the plurality of words included in the clue information 112 is larger than or equal to a predetermined threshold value. For example, the generation processing unit 130 detects the number of documents corresponding to "warehousing" included in the clue information 112 based on the inter-document relationship source information 200. Specifically, the number of documents corresponding to "warehousing" is the number of document IDs like the document IDs "1", "5" and "10". The generation processing unit 130 judges whether or not the number of documents corresponding to "warehousing" is larger than or equal to the threshold value based on the inter-document relationship source information 200. Incidentally, the threshold value is the number of documents calculated based on the number of the plurality of documents 111, for example. For example, the threshold value is set with a definition like 30% of the number of the plurality of documents 111. Similarly, the generation processing unit 130 detects the number of documents corresponding to "shipment" and the number of documents corresponding to "record". The generation processing unit 130 judges whether or not the number of documents corresponding to each of "shipment" and "record" is larger than or equal to the threshold value based on the inter-document relationship source information 200.

The generation processing unit 130 generates high frequency appearance information based on the result of the judgment. A concrete example of the high frequency appearance information will be shown below.

FIG. 5 is a diagram showing an example of the high frequency appearance information in the first embodiment. The high frequency appearance information 210 includes items of clue word, document ID, appearance line and appearance character position.

The generation processing unit 130 generates the high frequency appearance information 210 indicating relationship between a plurality of documents including a plurality of words (i.e., "warehousing" and "record") each corresponding to the number of documents larger than or equal to the threshold value and the appearance position of each of the plurality of words each corresponding to the number of documents larger than or equal to the threshold value.

FIG. 5 indicates that the number of documents corresponding to each of "warehousing" and "record" is larger than or equal to the threshold value. Since the number of documents corresponding to "shipment" is smaller than the threshold value, documents including only "shipment" are not included in the high frequency appearance information 210.

Based on the high frequency appearance information 210, the generation processing unit 130 generates vicinity appearance information indicating documents in which the plurality of words each corresponding to the number of documents larger than or equal to the threshold value appear in a predetermined range. Specifically, based on the high frequency appearance information 210, the generation processing unit 130 generates the vicinity appearance information indicating documents in which the plurality of words each corresponding to the number of documents larger than or equal to the threshold value appear in a predetermined range in one document. A concrete example of the vicinity appearance information will be shown below.

Figure 6:
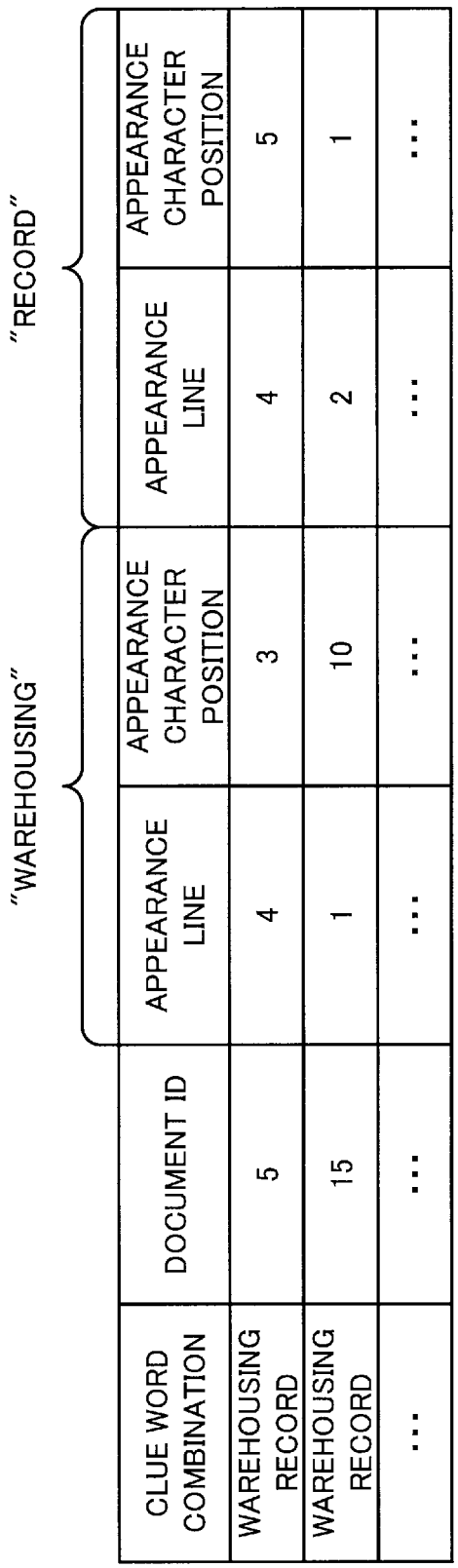
FIG. 6 is a diagram showing an example of vicinity appearance information in the first embodiment.

FIG. 6 is a diagram showing an example of the vicinity appearance information in the first embodiment. The vicinity appearance information 220 includes items of clue word combination, document ID, appearance line and appearance character position.

For example, the vicinity appearance information 220 indicates the document ID "5" of the document in which "warehousing" and "record" each corresponding to the number of documents larger than or equal to the threshold value appear in the predetermined range.

Further, the predetermined range is two lines, for example. Alternatively, the predetermined range is a range within 10 characters of "warehousing" forward and backward with reference to "warehousing", for example.

The words "warehousing" and "record" appear in the same line (i.e., the "4"th line) of the document with the document ID "5". Therefore, the document ID "5" is included in the vicinity appearance information 220.

The generation processing unit 130 deletes the high frequency appearance information 210 from the inter-document relationship source information 200. The generation processing unit 130 generates new inter-document relationship source information by adding the vicinity appearance information 220 to the inter-document relationship source information 200. An example of the new inter-document relationship source information will be shown below.

FIG. 7 is a diagram showing an example of the new inter-document relationship source information in the first embodiment. In the new inter-document relationship source information 230, the high frequency appearance information 210 has been deleted. Further, the new inter-document relationship source information 230 includes the vicinity appearance information 220 added thereto.

The generation processing unit 130 generates an inter-document relationship table based on the new inter-document relationship source information 230. The inter-document relationship table is information indicating relationship between documents. The inter-document relationship table will be shown concretely below.

FIG. 8 is a diagram showing an example of the inter-document relationship table in the first embodiment. The inter-document relationship table 113 is referred to also as inter-document relationship information. The inter-document relationship table 113 includes items of clue word combination, document ID and inter-document relationship score.

For example, the inter-document relationship table 113 indicates that the document with the document ID "5" and the document with the document ID "15" have relationship with each other. The document with the document ID "5" and the document with the document ID "15" are documents including "warehousing" and "record". Therefore, the document with the document ID "5" and the document with the document ID "15" have strong relationship with each other.

The inter-document relationship score indicates a relationship level between documents. For example, the inter-document relationship score is the tf-idf value. When the tf-idf value is calculated, it is possible to regard "warehousing" and "record" as one word and calculate the sum total of the tf-idf value regarding the document ID "5" and the tf-idf value regarding the document ID "15" as the inter-document relationship score. It is also possible to calculate the average value of the tf-idf value regarding the document ID "5" and the tf-idf value regarding the document ID "15" as the inter-document relationship score.

Further, it is also possible to calculate the sum total of the tf-idf value of "warehousing" regarding the document ID "5", the tf-idf value of "record" regarding the document ID "5", the tf-idf value of "warehousing" regarding the document ID "15" and the tf-idf value of "record" regarding the document ID "15" as the inter-document relationship score. Further, it is also possible to calculate an average value obtained by using the sum total as the inter-document relationship score.

Alternatively, the inter-document relationship score is a score of Okapi BM25, for example. This score is represented by using expression (1).

$$\text{score}\,(D, Q) = \sum_{i=1}^{n} IDF(q_i) \cdot \frac{f(q_i, D) \cdot (k_1 + 1)}{f(q_i, D) + k_1 \cdot \left(1 - b + b \cdot \frac{|D|}{avgdl}\right)} \quad (1)$$

Incidentally, $q_i$ represents a combination of high frequency important words included in the document D (e.g., a combination of "warehousing" and "record"). The part $f(q_i, D)$ represents an appearance frequency of $q_i$ in the document D. The part $|D|$ represents the number of words in the document D. The part avgdl represents an average number of words in regard to a document set. The characters $k_1$ and b represent arbitrary parameters.

The factor $IDF(q_i)$ represents the IDF value of the words. The factor $IDF(q_i)$ is represented by using expression (2).

$$IDF(q_i) = \log \frac{N - n(q_i) + 0.5}{n(q_i) + 0.5} \quad (2)$$

The character N represents the total number of documents. The term $n(q_i)$ represents the number of documents including $q_i$.

Next, a process executed by the information processing device 100 will be described below by using a flowchart.

Figure 9:
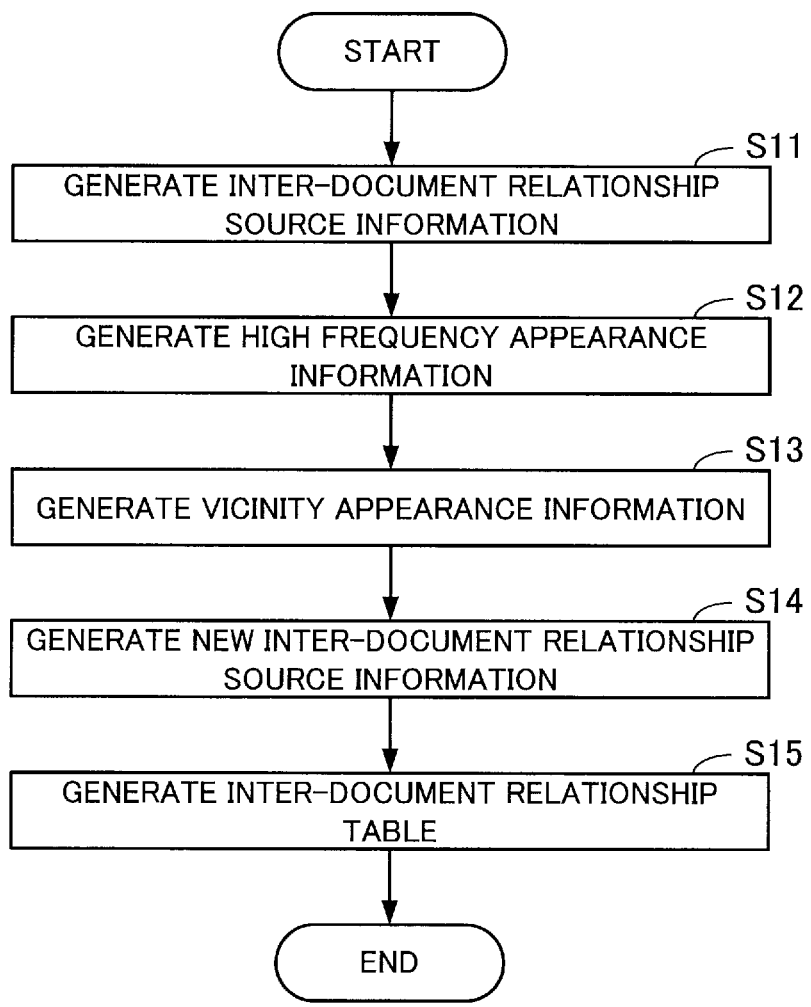
FIG. 9 is a flowchart showing an example of a process executed by the information processing device in the first embodiment.

FIG. 9 is a flowchart showing an example of the process executed by the information processing device in the first embodiment.

(Step S11) The generation processing unit 130 generates the inter-document relationship source information 200 based on the plurality of documents 111 and the clue information 112.

(Step S12) The generation processing unit 130 generates the high frequency appearance information 210 by using the inter-document relationship source information 200.

(Step S13) The generation processing unit 130 generates the vicinity appearance information 220 based on the high frequency appearance information 210.

(Step S14) The generation processing unit 130 generates the new inter-document relationship source information 230.

(Step S15) The generation processing unit 130 generates the inter-document relationship table 113 based on the new inter-document relationship source information 230. Further, the generation processing unit 130 calculates the inter-document relationship scores based on the new inter-document relationship source information 230. The calculated inter-document relationship scores are included in the inter-document relationship table 113. The generation processing unit 130 may store the inter-document relationship table 113 in the storage unit 110.

The above description has been given of the case where the inter-document relationship table 113 is generated based on the new inter-document relationship source information 230. It is also possible for the generation processing unit 130 to generate the inter-document relationship table 113 based on the vicinity appearance information 220. In the case where the inter-document relationship table 113 is generated based on the vicinity appearance information 220, the records "shipment" in FIG. 8 are not generated in the inter-document relationship table 113. Further, it is also possible for the generation processing unit 130 to calculate the inter-document relationship scores based on the vicinity appearance information 220. Specifically, the generation processing unit 130 calculates the inter-document relationship scores based on a plurality of words indicated by the vicinity appearance information 220 and a plurality of documents including the plurality of words. Then, the generation processing unit 130 may generate the inter-document relationship table 113 including the calculated inter-document relationship scores.

Here, an example of a method of using the inter-document relationship table 113 will be described below. For example, "warehousing" is inputted to the information processing device 100 as a keyword. The information processing device 100 detects documents with the document ID "5" and so forth including "warehousing" by a conventional method of the Patent Reference 1 or the like. The information processing device 100 refers to the inter-document relationship table 113 and identifies the document ID "15" and the document ID "25" having strong relationship with the document ID "5" included in the search result. The information processing device 100 outputs the document with the document ID "15" and the document with the document ID "25" as documents relevant to the document ID "5" in a format different from the search result. Further, when outputting these relevant documents, the information processing device 100 determines the order of outputting the documents based on the inter-document relationship scores.

As above, by use of the inter-document relationship scores, the information processing device 100 is capable of outputting a list of the relevant documents in descending order of the strength of the relationship with each document in the search result.

Here, as a method of associating documents with each other, it is possible to consider a method of associating one document with documents each having relationship with a respective word among all the words included in the one document. However, with this method, there are cases where a document having weak relationship with the one document, such as a document associated with the one document by only one word among a lot of words included in the one document, is associated with the one document. Further, since a lot of words are included in one document, a great amount of relevance is obtained by this method and there is a problem in that the user has no idea which relevant document to refer to.

When generating the inter-document relationship table 113, the information processing device 100 does not associate a certain document with documents each having relationship with a respective word among all the words included in the certain document. The information processing device 100 associates documents with each other that include a plurality of words appearing at a high frequency in the inter-document relationship source information 200 and include the plurality of words appearing in the vicinity in the document. The documents associated with each other can be considered to have strong relationship with each other. The documents associated with each other are registered in the inter-document relationship table 113. Thus, according to the first embodiment, the information processing device 100 is capable of preventing the association with a document having weak relationship based on the inter-document relationship table 113.

Figure 10:
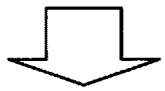
FIG. 10 is a diagram showing a modification of the inter-document relationship table in the first embodiment.

Here, the inter-document relationship table 113 may be modified as follows:

FIG. 10 is a diagram showing a modification of the inter-document relationship table in the first embodiment. It is assumed here that the inter-document relationship table 113 shown in FIG. 10 has been generated. The inter-document relationship table 113 in FIG. 10 indicates that the document with the document ID "5" and the document with the document ID "15" including "warehousing" and "record" have relationship with each other. Further, the inter-document relationship table 113 in FIG. 10 indicates that the document with the document ID "5" and the document with the document ID "15" including "shipment" have relationship with each other. Since the inter-document relationship is the same, ""warehousing" and "record"" and "shipment" may be aggregated into one record. The inter-document relationship score may also be obtained as the sum total or the average value of respective inter-document relationship scores.

Second Embodiment

Next, a second embodiment will be described below. In the second embodiment, the description will be given mainly of features different from those in the first embodiment. In the second embodiment, the description is omitted for features in common with the first embodiment.

In the first embodiment, the description was given of the case where a plurality of words are included in the clue information 112. In the second embodiment, a description will be given of a case where a compound word or a sentence is included in the clue information 112.

First, a description will be given of a case where a compound word is included in the clue information 112. An example of the clue information 112 including a compound word will be shown below.

Figure 11:
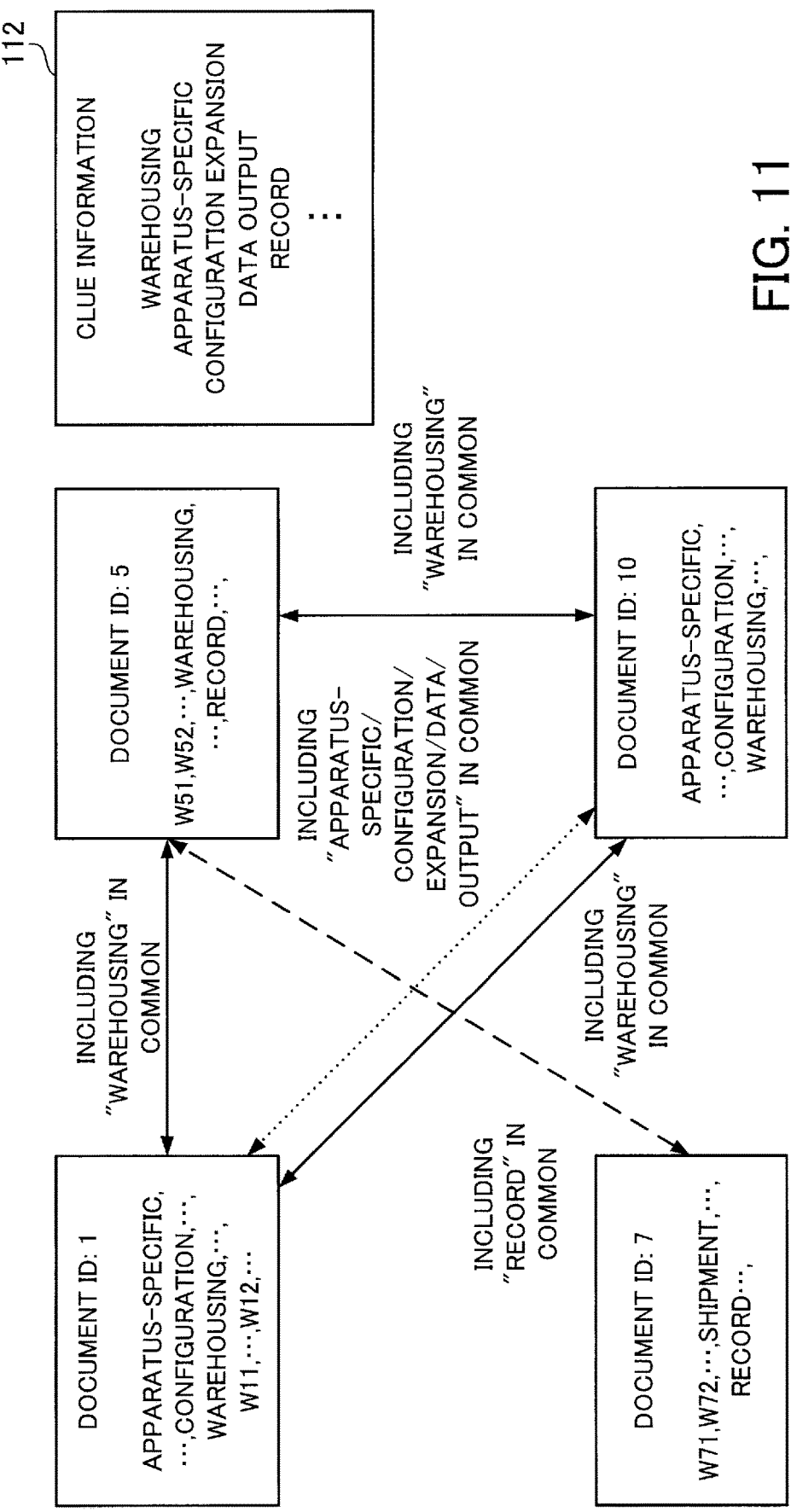
FIG. 11 is a diagram showing an example of clue information in a second embodiment.

FIG. 11 is a diagram showing an example of the clue information in the second embodiment. FIG. 11 indicates that "apparatus-specific configuration expansion data output" is included in the clue information 112. The phrase "apparatus-specific configuration expansion data output" is a compound word. The compound word "apparatus-specific configuration expansion data output" is a word made up of a sequence of "apparatus-specific", "configuration", "expansion", "data" and "output" (i.e., a plurality of words).

The generation processing unit 130 is capable of extracting the plurality of words (i.e., "apparatus-specific", "configuration", "expansion", "data" and "output") forming "apparatus-specific configuration expansion data output" by using morphological analysis.

The generation processing unit 130 detects a plurality of documents in which the plurality of words forming the compound word appear in a predetermined range based on the plurality of documents 111 and the clue information 112. For example, the generation processing unit 130 detects a plurality of documents (e.g., the documents with the document IDs "1" and "10") in which "apparatus-specific", "configuration", "expansion", "data" and "output" appear in the range. Further, the predetermined range is two lines, for example. Incidentally, the order of appearance of "apparatus-specific", "configuration", "expansion", "data" and "output" in the range can be either order the same as or different from "apparatus-specific", "configuration", "expansion", "data" and "output".

The generation processing unit 130 detects the appearance position of each of the plurality of words forming the compound word in the document.

The generation processing unit 130 generates the inter-document relationship source information indicating the relationship between the detected document and the appearance position. An example of the inter-document relationship source information will be shown below.

FIG. 12 is a diagram showing an example of the inter-document relationship source information in the second embodiment. The inter-document relationship source information 200a includes items of clue word, document ID, appearance line and appearance character position. Incidentally, the items of appearance line and appearance character position may be regarded as an item of appearance position.

For example, the inter-document relationship source information 200a indicates that "apparatus-specific", "configuration", "expansion", "data" and "output" are included in the document with the document ID "1". Further, the inter-document relationship source information 200a indicates that one of "apparatus-specific", "configuration", "expansion", "data" and "output" appears at the "2"nd character in the "10"th line of the document with the document ID "1".

The generation processing unit 130 generates the inter-document relationship source information 200a as above.

The above description has been given of the case of detecting a plurality of documents in which all the words forming the compound word appear in the range. It is also possible for the generation processing unit 130 to detect a plurality of documents in which at least one of the plurality of words forming the compound word appears in the range. For example, the generation processing unit 130 detects a plurality of documents in which four words "apparatus-specific", "configuration", "data" and "output" appear in the range.

Here, information in a frame 201 in the inter-document relationship source information 200a is not changed until the inter-document relationship table is generated. In short, processing after generating the inter-document relationship source information 200a is the same as that in the first embodiment.

The generation processing unit 130 generates the inter-document relationship table based on the plurality of detected documents. An example of the inter-document relationship table will be shown below.

FIG. 13 is a diagram showing an example of the inter-document relationship table in the second embodiment. For example, the generation processing unit 130 generates the inter-document relationship table 113a based on the plurality of detected documents (e.g., documents with the document IDs "1" and "10"). The inter-document relationship table 113a indicates that the document with the document ID "1" and the document with the document ID "10" have relationship with each other.

The generation processing unit 130 calculates the inter-document relationship scores based on at least one of the plurality of words forming the compound word or the plurality of words forming the compound word and the plurality of detected documents. For example, when the tf-idf value is calculated, the generation processing unit 130 regards "apparatus-specific", "configuration", "expansion", "data" and "output" as one word and calculates the sum total of the tf-idf value regarding the document ID "1" and the tf-idf value regarding the document ID "10" as the inter-document relationship score. The calculated inter-document relationship score is included in the inter-document relationship table 113a.

Next, a description will be given of a case where a sentence is included in the clue information 112.

The sentence includes a plurality of words. The sentence may be expressed as a character string including at least a postpositional particle (of the Japanese language) and a plurality of words. For example, the sentence is "output expansion data having apparatus-specific configuration".

The generation processing unit 130 detects a plurality of documents in which a plurality of words included in the sentence appear in a predetermined range based on the plurality of documents 111 and the clue information 112. Incidentally, the predetermined range is two lines, for example. Further, the generation processing unit 130 is capable of extracting a plurality of words included in the sentence by using morphological analysis. For example, the generation processing unit 130 is capable of extracting "apparatus-specific", "configuration", "expansion", "data" and "output" included in the sentence by using morphological analysis. Incidentally, a word as a verb may be modified to a word as a noun as shown in the example.

The generation processing unit 130 detects the appearance position of each of the plurality of words included in the sentence in the document.

The generation processing unit 130 generates the inter-document relationship source information indicating the relationship between the detected document and the appearance position. By this, information like the inter-document relationship source information 200a is generated.

The above description has been given of the case of detecting a plurality of documents in which all the words included in the sentence appear in the range. It is also possible for the generation processing unit 130 to detect a plurality of documents in which at least one of the plurality of words included in the sentence appears in the range.

As the above, information indicating relationship among the plurality of words included in the sentence, the detected document and the appearance positions (e.g., information in the frame 201 in FIG. 12) is not changed until the inter-document relationship table is generated.

The generation processing unit 130 generates the inter-document relationship table based on the plurality of detected documents. By this, information like the inter-document relationship table 113a is generated. Further, the inter-document relationship scores included in the generated inter-document relationship table are calculated as follows. The generation processing unit 130 calculates the inter-document relationship scores based on at least one of the plurality of words including the sentence or the plurality of words including the sentence and the plurality of detected documents.

Next, a process executed by the information processing device 100 will be described below by using a flowchart.

FIG. 14 is a flowchart showing an example of the process executed by the information processing device in the second embodiment.

(Step S21) The generation processing unit 130 generates the inter-document relationship source information 200a based on the plurality of documents 111 and the clue information 112. The information in the frame 201 in the inter-document relationship source information 200a is not changed until the inter-document relationship table 113a is generated.

(Step S22) The generation processing unit 130 generates the high frequency appearance information 210 by using the inter-document relationship source information 200a. Incidentally, when generating the high frequency appearance information 210, the generation processing unit 130 does not use the information in the frame 201 in the inter-document relationship source information 200a.

(Step S23) The generation processing unit 130 generates the vicinity appearance information 220 based on the high frequency appearance information 210.

(Step S24) The generation processing unit 130 deletes the high frequency appearance information 210 from the inter-document relationship source information 200a. The generation processing unit 130 generates the new inter-document relationship source information by adding the vicinity appearance information 220 to the inter-document relationship source information 200a.

(Step S25) The generation processing unit 130 generates the inter-document relationship table 113a based on the new inter-document relationship source information. Further, the generation processing unit 130 calculates the inter-document relationship scores based on the new inter-document relationship source information. The calculated inter-document relationship scores are included in the inter-document relationship table 113a. The generation processing unit 130 may store the inter-document relationship table 113a in the storage unit 110.

Here, there are few documents including a compound word or a sentence perfectly coinciding with a compound word or a sentence included in the clue information 112. Therefore, when a compound word or a sentence is included in the clue information 112, it is difficult to detect a document having strong relationship. However, by executing the above-described method, the information processing device 100 is capable of detecting a document having strong relationship even when a compound word or a sentence is included in the clue information 112.

Features in the embodiments described above can be appropriately combined with each other.

DESCRIPTION OF REFERENCE CHARACTERS

100: information processing device, 101: processor, 102: volatile storage device, 103: nonvolatile storage device, 110: storage unit, 111: a plurality of documents, 112: clue information, 113, 113a: inter-document relationship table, 120: acquisition unit, 130: generation processing unit, 200, 200a: inter-document relationship source information, 201: frame, 210: high frequency appearance information, 220: vicinity appearance information, 230: new inter-document relationship source information

What is claimed is:

1. An information processing device comprising:
   a memory;
   acquiring circuitry to acquire a plurality of documents and clue information including a plurality of words, the clue information being information acquired from a user of the information processing device or information stored in the memory; and
   generation processing circuitry to
   generate inter-document relationship source information indicating relationship between a plurality of documents including at least one of the plurality of words included in the clue information and an appearance position of each of the plurality of words included in the clue information in the document based on the plurality of documents and the clue information;
   judge based on the inter-document relationship source information whether or not a number of documents corresponding to each of the plurality of words included in the clue information is larger than or equal to a predetermined threshold value;
   generate high frequency appearance information indicating relationship between a plurality of documents including a plurality of words each corresponding to the number of documents larger than or equal to the threshold value and the appearance position of each of the plurality of words each corresponding to the number of documents larger than or equal to the threshold value in the document;
   generate vicinity appearance information indicating documents in which the plurality of words each corresponding to the number of documents larger than or equal to the threshold value appear in a predetermined range based on the high frequency appearance information,
   generate new inter-document relationship source information based on the vicinity appearance information and the inter-document relationship source information,
   calculate an inter-document relationship score indicating a relationship level between documents based on the new inter-document relationship source information;
   generate inter-document relationship information indicating relationship between documents based on the new inter-document relationship source information and the inter-document relationship score, and
   output a list of documents based on the inter-document relationship information.

2. The information processing device according to claim 1, wherein
   the clue information includes a compound word as a word made up of a sequence of a plurality of words, and
   the generation processing circuitry detects a plurality of documents in which at least one of the plurality of words forming the compound word appears in a predetermined range based on the plurality of documents and the clue information and generates the inter-document relationship information based on the plurality of detected documents.

3. The information processing device according to claim 2, wherein the generation processing circuitry detects a plurality of documents in which the plurality of words forming the compound word appear in a predetermined range based on the plurality of documents and the clue information and generates the inter-document relationship information based on the plurality of detected documents.

4. The information processing device according to claim 2, wherein the generation processing circuitry calculates an inter-document relationship score indicating a relationship level between documents based on at least one of the plurality of words forming the compound word or the plurality of words forming the compound word and the plurality of detected documents and generates the inter-document relationship information including the inter-document relationship score.

5. The information processing device according to claim 1, wherein
   the clue information includes a sentence including a plurality of words, and
   the generation processing circuitry detects a plurality of documents in which at least one of the plurality of words included in the sentence appears in a predetermined range based on the plurality of documents and the clue information and generates the inter-document relationship information based on the plurality of detected documents.

6. The information processing device according to claim 5, wherein the generation processing circuitry detects a plurality of documents in which the plurality of words included in the sentence appear in a predetermined range based on the plurality of documents and the clue information and generates the inter-document relationship information based on the plurality of detected documents.

7. The information processing device according to claim 5, wherein the generation processing circuitry calculates an inter-document relationship score indicating a relationship level between documents based on at least one of the plurality of words included in the sentence or the plurality of words included in the sentence and the plurality of detected documents and generates the inter-document relationship information including the inter-document relationship score.

8. A generation method performed by an information processing device which includes a memory, the generation method comprising:
   acquiring a plurality of documents and clue information including a plurality of words, the clue information being information acquired from a user of the information processing device or information stored in the memory;
   generating inter-document relationship source information indicating relationship between a plurality of documents including at least one of the plurality of words included in the clue information and an appearance position of each of the plurality of words included in the clue information in the document based on the plurality of documents and the clue information;
   judging based on the inter-document relationship source information whether or not a number of documents corresponding to each of the plurality of words included in the clue information is larger than or equal to a predetermined threshold value;
   generating high frequency appearance information indicating relationship between a plurality of documents including a plurality of words each corresponding to the number of documents larger than or equal to the threshold value and the appearance position of each of the plurality of words each corresponding to the number of documents larger than or equal to the threshold value in the document;
   generating vicinity appearance information indicating documents in which the plurality of words each corresponding to the number of documents larger than or equal to the threshold value appear in a predetermined range based on the high frequency appearance information;

generating new inter-document relationship source information based on the vicinity appearance information and the inter-document relationship source information;

calculating an inter-document relationship score indicating a relationship level between documents based on the new inter-document relationship source information;

generating inter-document relationship information indicating relationship between documents based on the new inter-document relationship source information and the inter-document relationship score; and outputting a list of documents based on the inter-document relationship information.

9. An information processing device comprising:

a processor to execute a program; and a memory to store the program which, when executed by the processor, performs processes of, acquiring a plurality of documents and clue information including a plurality of words, the clue information being information acquired from a user of the information processing device or information stored in the memory;

generating inter-document relationship source information indicating relationship between a plurality of documents including at least one of the plurality of words included in the clue information and an appearance position of each of the plurality of words included in the clue information in the document based on the plurality of documents and the clue information;

judging based on the inter-document relationship source information whether or not a number of documents corresponding to each of the plurality of words included in the clue information is larger than or equal to a predetermined threshold value;

generating high frequency appearance information indicating relationship between a plurality of documents including a plurality of words each corresponding to the number of documents larger than or equal to the threshold value and the appearance position of each of the plurality of words each corresponding to the number of documents larger than or equal to the threshold value in the document;

generating vicinity appearance information indicating documents in which the plurality of words each corresponding to the number of documents larger than or equal to the threshold value appear in a predetermined range based on the high frequency appearance information;

generating new inter-document relationship source information based on the vicinity appearance information and the inter-document relationship source information;

calculating an inter-document relationship score indicating a relationship level between documents based on the new inter-document relationship source information;

generating inter-document relationship information indicating relationship between documents based on the new inter-document relationship source information and the inter-document relationship score; and outputting a list of documents based on the inter-document relationship information.

\* \* \* \* \*